(12) United States Patent
Baek

(10) Patent No.: US 11,553,309 B2
(45) Date of Patent: Jan. 10, 2023

(54) INDOOR AND OUTDOOR SEAMLESS POSITIONING SWITCHING DEVICE INCLUDING DOMAINS AND ACTORS

(71) Applicant: JastecM CO., LTD., Gyeonggi-do (KR)

(72) Inventor: Yongbeom Baek, Gyeonggi-do (KR)

(73) Assignee: JastecM CO., LTD., Gyeonggi-Do (KR)

( * ) Notice: Subject to any disclaimer, the term of this patent is extended or adjusted under 35 U.S.C. 154(b) by 65 days.

(21) Appl. No.: 17/316,810

(22) Filed: May 11, 2021

(65) Prior Publication Data

US 2022/0322038 A1 Oct. 6, 2022

(30) Foreign Application Priority Data

Mar. 30, 2021 (KR) .................. 10-2021-0041411

(51) Int. Cl.
*H04W 4/029* (2018.01)
*G01S 19/42* (2010.01)
*G01C 21/20* (2006.01)

(52) U.S. Cl.
CPC .......... *H04W 4/029* (2018.02); *G01C 21/206* (2013.01); *G01S 19/42* (2013.01)

(58) Field of Classification Search
CPC ....... H04W 4/029; G01C 21/206; G01S 19/42
See application file for complete search history.

(56) References Cited

U.S. PATENT DOCUMENTS

| | | | | |
|---|---|---|---|---|
| 10,827,324 | B1 * | 11/2020 | Hajimiri | ............... H04W 4/029 |
| 10,848,911 | B1 * | 11/2020 | Mallesan | ............ G01S 5/02695 |
| 11,477,603 | B2 * | 10/2022 | Danducci, II | ......... H04W 4/021 |
| 2011/0018732 | A1 * | 1/2011 | Cho | .................... G01S 5/02525 |
| | | | | 340/8.1 |
| 2016/0351053 | A1 * | 12/2016 | Jung | ................ G08G 1/096791 |
| 2021/0209713 | A1 * | 7/2021 | Imtiyaz | .................. G06Q 50/30 |
| 2021/0243716 | A1 * | 8/2021 | Ma | .......................... G01S 11/02 |
| 2022/0182785 | A1 * | 6/2022 | Edge | ................... G01S 5/02521 |

* cited by examiner

*Primary Examiner* — Dai Phuong
(74) *Attorney, Agent, or Firm* — The PL Law Group, PLLC

(57) ABSTRACT

An indoor and outdoor seamless positioning transition device according to an embodiment of the present disclosure includes a personal domain providing information related to a user, a IoT domain providing information related to a vehicle, an infrastructure domain that provides information related to an infrastructure, a sensor domain collecting information for data exchange between domains, and a positioning domain calculating positioning of the user or the vehicle using data transmitted from the domain. The indoor and outdoor seamless positioning may be calculated through data exchange between the respective domains and a cloud server.

11 Claims, 7 Drawing Sheets

INDOOR AND OUTDOOR SEAMLESS POSITIONING SWITCHING DEVICE INCLUDING DOMAINS AND ACTORS

CROSS REFERENCE TO RELATED APPLICATION

The present application claims priority to Korean Patent Application No. 10-2021-0041411, filed on Mar. 30, 2021, the entire contents of which is incorporated herein for all purposes by this reference.

BACKGROUND

1. Field of the Invention

The present invention relates to an indoor and outdoor seamless positioning switching device that performs continuous and seamless positioning calculations.

2. Description of the Related Art

Along with the development of IoT technology for autonomous vehicles, continuous and seamless positioning calculations are becoming increasingly important in various application areas.

SUMMARY

The present invention has been made keeping in mind the above problems occurring in the related art, and an objective of the present invention is to provide an indoor and outdoor seamless positioning switching device that enables continuous and seamless positioning calculations in an immediate manner.

According to an aspect of the present invention, an indoor and outdoor seamless positioning transition device is proposed, the device including a personal domain providing information related to a user; a IoT domain providing information related to a vehicle; an infrastructure domain that provides information related to an infrastructure; a sensor domain collecting information for data exchange between domains; and a positioning domain calculating positioning of the user or the vehicle using data transmitted from the domain, wherein the indoor and outdoor seamless positioning is calculated through data exchange between the respective domains and a cloud server.

The positioning fusion actor PT-F may collectively process data from all domains. The information required for positioning calculation may be received from different domains. A common received value of sensor data from sensors in the personal domain PD, the sensor domain SD, and the IoT domain IoTD may be defined. The common received value may be in a common message format and expressed as PVT services in an extended interface for indoor and outdoor seamless positioning calculations in the positioning fusion actor PT-F.

Considering a case where a user (individual) in a building is to board an autonomous vehicle outside at a set time, the location and elevation of the autonomous vehicle and the user can be calculated by continuously tracking the location of the autonomous vehicle and continuously tracking the user's location, thereby obtaining the timing when they meet each other.

The seamless positioning calculation according to the present invention can be associated with various fields, such as transportation unit tracking, indoor or indoor navigation, traffic congestion monitoring and control, accident scene finding, emergencies occurrence monitoring, and the like.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION

Figure 1:
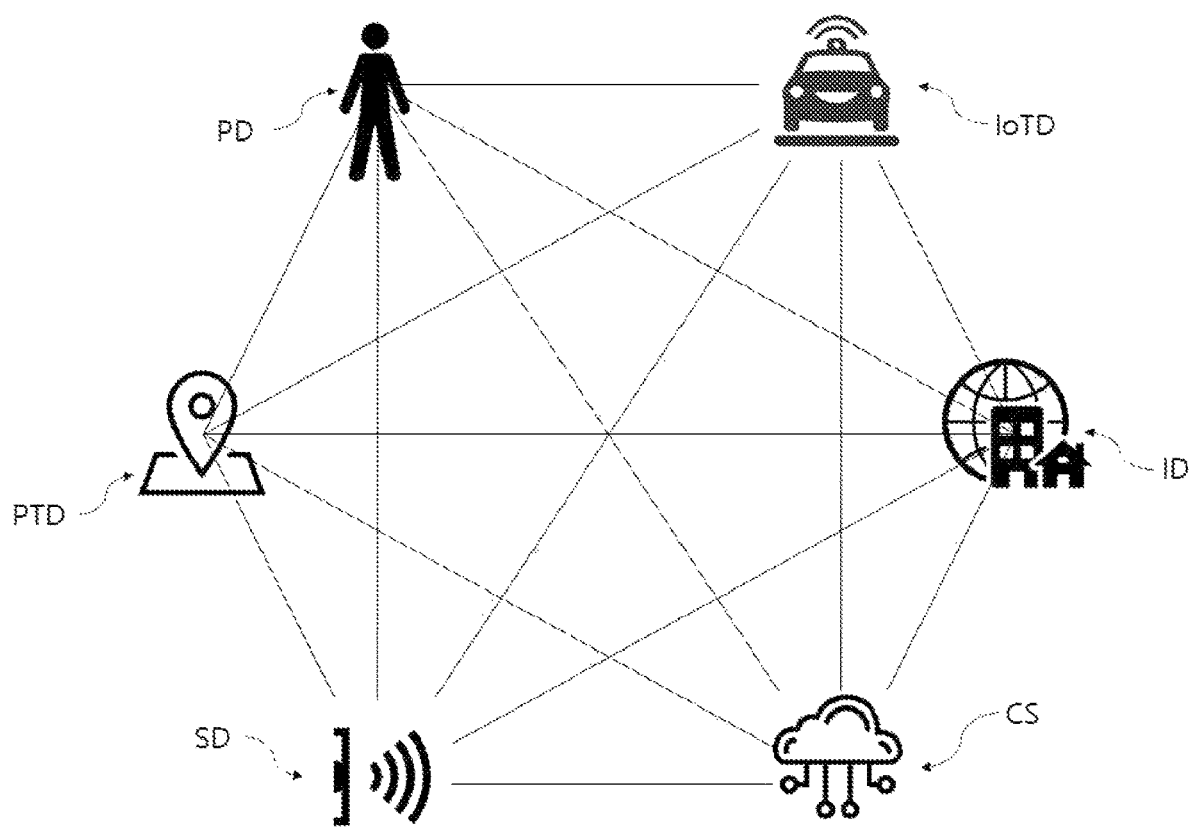
FIG. 1 is an explanatory diagram showing each component according to the present invention.
Figure 2:
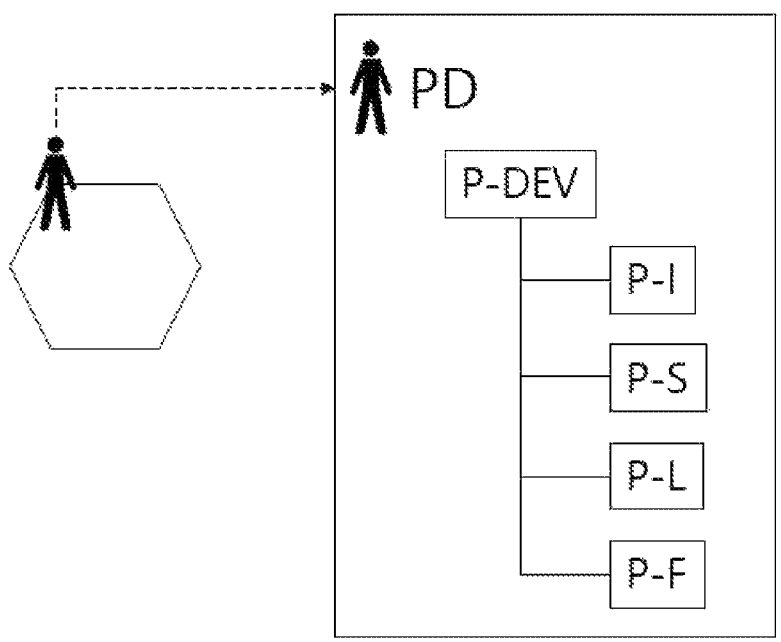
FIG. 2 is a configuration diagram showing a personal domain of the present invention.
Figure 3:
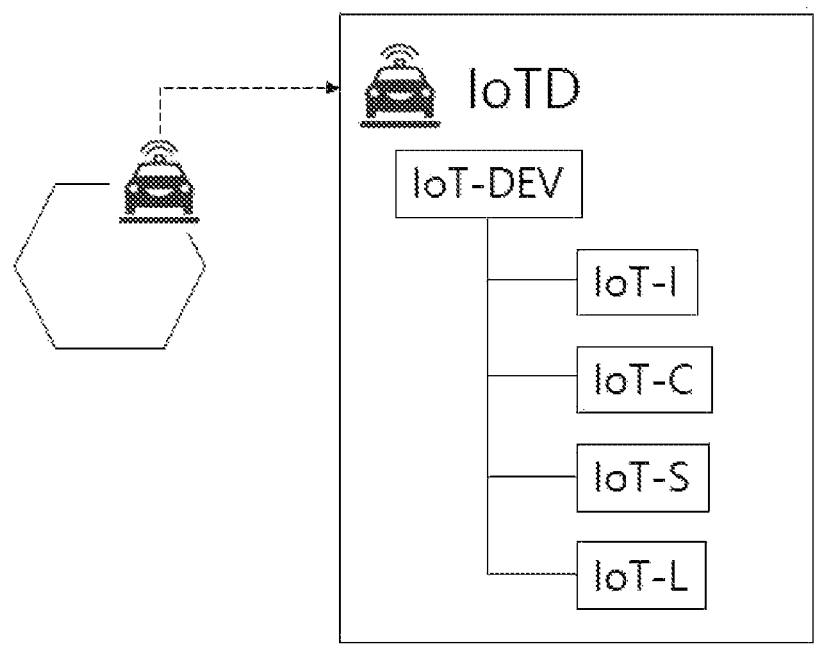
FIG. 3 is a block diagram showing an IoT domain according to the present invention.
Figure 4:
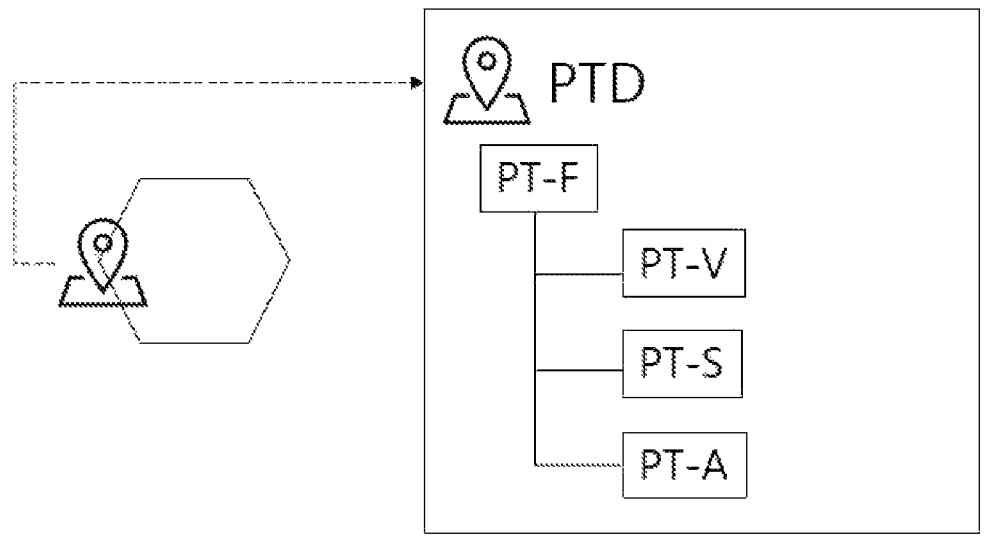
FIG. 4 is a block diagram showing a positioning domain of the present invention.
Figure 5:
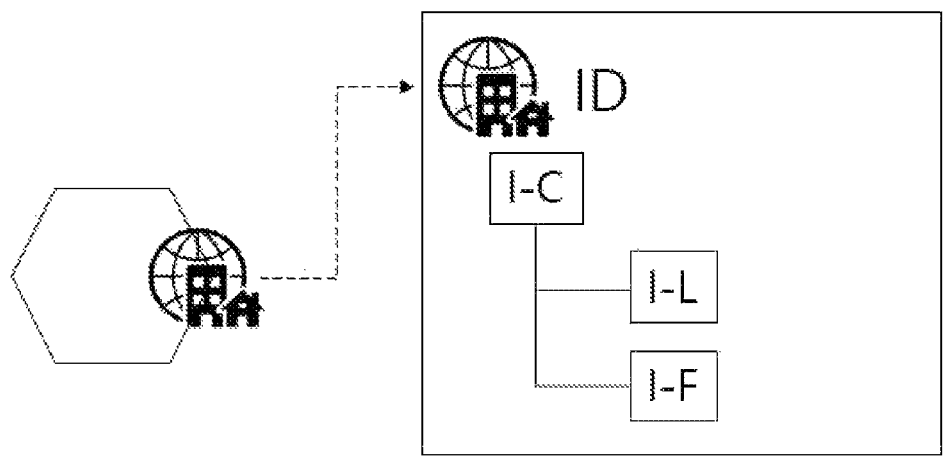
FIG. 5 is a block diagram showing an infrastructure domain of the present invention.
Figure 6:
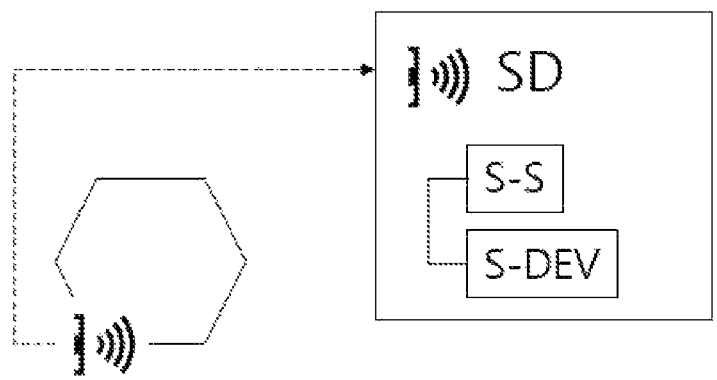
FIG. 6 is a configuration diagram showing a sensor domain of the present invention.
Figure 7:
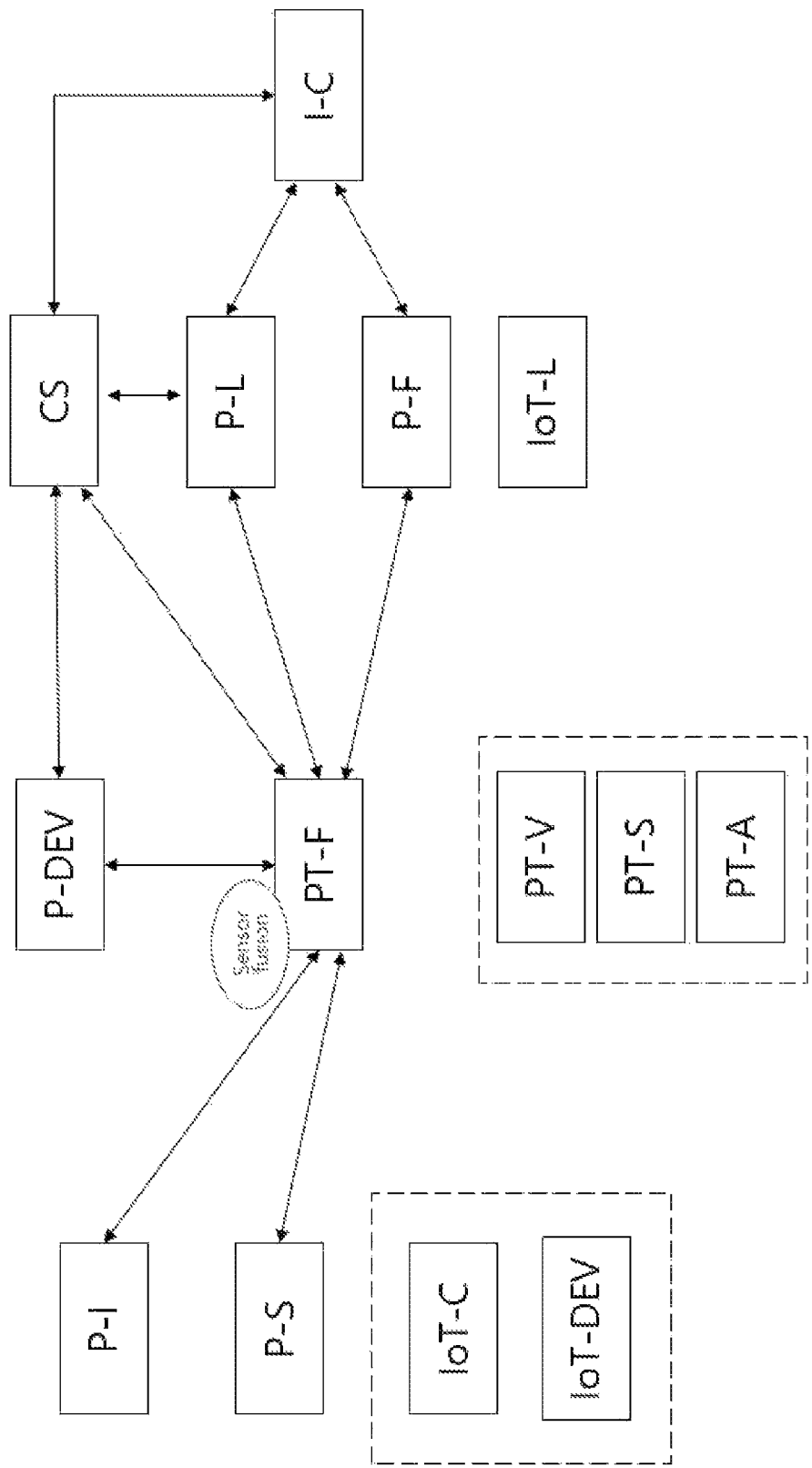
FIG. 7 is an example showing a case where a user is located indoors.
Figure 8:
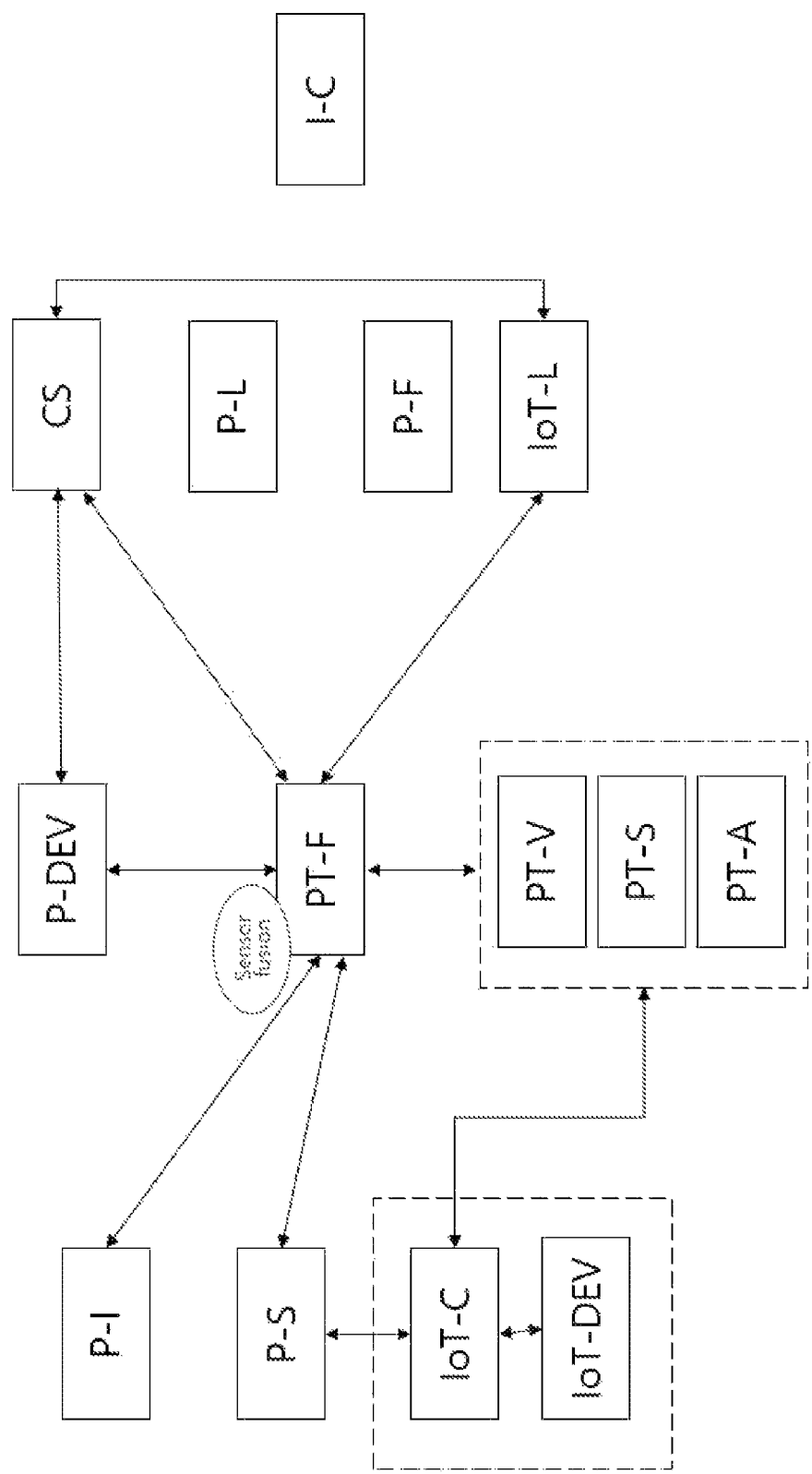
FIG. 8 is an example showing a case where a user is located outdoors.

Delayed or unconnected indoor and outdoor positioning of autonomous vehicles may cause serious problems, including various accidents.

The important things in performing indoor and outdoor seamless positioning calculations based on the personal domain PD are a common message format for positioning calculation and an extended interface for stable and reliable positioning calculations.

The common message format may refer to a common structure of a message that is input to achieve indoor and outdoor seamless positioning calculations, which means the structural complexity is greatly reduced in encoding. Therefore, information received from a global navigation satellite system (GNSS), inertial measurement unit (IMU), wireless fidelity (Wi-Fi), Odometer, Telecom Recv (received signal strength indication), etc. may be sent to the calculation unit in a separate format for the purpose of positioning calculations of PVT (position, velocity, timing) service. Herein, operations needed to perform the positioning calculations are very complex, so that it takes a long time to perform the operations. However, when information of sensors measured in each domain is received as a common received value according to the common message format, it is possible to reduce the complexity of calculation and shorten the time that it takes to perform the calculation.

The data of various sensors measured in various domains are not calculated in individual formats and displayed in individual interfaces, but the sensing information received by the positioning fusion actor PT-F from each domain may be calculated using the common message format or the common received value and expressed as PVT services in an extended interface.

The common actor is used for seamless indoor and outdoor positioning through sensor fusion, and may be a sub-actor of a device-attached sensor unit used for location recognition (GPS, Lidar, IMU, Odometer, etc.), a service sensor actor (SS) (A-GPS, D-GPS, etc.), and a positioning domain (PTD) that controls the sensor.

That is, actors that are common to the personal domain PD, the IoT domain IoTD, and the infrastructure domain ID may be constituent actors of the sensor domain SD and the positioning domain PTD.

In addition, according to a calculation entity that calculates the resulting positioning using information from various sensor domains SD, the positioning may be divided into server-based indoor positioning method or terminal-based indoor positioning method, which may be related to the source of information during sequence operation between domains in conjunction with the information stored by the calculation entity for the purpose of positioning determination. For example, in the case of server-based indoor positioning, information such as a routing path may be requested to each actor or an additional cloud server (CS), and in the case of terminal-based indoor positioning, information such as a routing path may be requested to each actor, an additional terminal, or a personal device actor P-DEV.

A device according to the present invention may include a cloud server CS and a plurality of domains.

The plurality of domains may include a personal domain PD, an IoT domain IoTD, a sensor domain SD, an infrastructure domain ID, and a positioning domain PTD. Each domain may be classified according to its execution entity and role, and an element belonging to a lower level of each domain may be referred to as an actor. The actor may mean each unit that will be described below.

The execution entity of the personal domain PD may be a device that is always possessed by a user to transmit location information through a mobile communication network. The personal domain PD may independently provide location information of people or objects. The personal domain PD may provide location information of people or objects through data exchange with another domain. The personal domain PD may use vehicles, bicycles, trains, E-mobility, and the like belonging to the IoT domain IoTD.

The personal domain PD may include a personal device actor P-DEV, a personal information actor P-I, a personal state actor P-S, a personal location actor P-L, and a personal elevation actor P-F.

The personal device actor P-DEV may be provided with GPS, Wi-Fi, BT (Bluetooth), and RFID. The personal device actor P-DEV may be an action entity in the personal domain PD.

The personal device actor P-DEV may store information of actors of the personal domain PD to operate the processor. That is, the device sensor actor S-DEV may be provided for indoor and outdoor seamless positioning and be responsible for information processing with the service sensor actor S-S through an available communication network. The location and routing information may be transmitted to another domain or the cloud server CS through a communication network.

The personal information actor P-I may be registration information, such as a person's location, gender, age, and a type of disability, which are necessary for calculating a moving distance. The registration information may be related to whether a user is driving or walking, or whether a user is a male or female, or whether a user is an adult or a child, the presence of absence of a disability, a type of disability, and the like. The personal information actor P-I may be needed for accurate calculation of location or path.

The personal state actor P-S may detect or determine whether a user is moving or not and whether a user is boarding a vehicle or not. Through a sensor mounted on the personal device actor P-DEV, it is possible to determine the user's motion on the basis of an IMU sensor and determine the user's boarding of a vehicle on the basis of Wi-Fi or BT.

The personal location actor P-L may perform accurate location analysis and determination for the user's continuous positioning. Based on maps, access points, and routing, or sensors mounted on the personal device actor P-DEV, it is possible to distinguish between places such as a city center, provinces, indoors, and tunnels, and analyze and determine the surrounding traffic conditions such as crossing, traversing, and intersections.

The personal elevation actor P-F may be information on the number of indoor floors where a user or a vehicle is located. That is, the information on the number of indoor floors may be related to elevation from the ground, such as whether the user or vehicle is in a basement, an intermediate floor, or a top floor.

The execution entity of the IoT domain IoTD may be a service provider that provides a vehicle or E-mobility service. The IoT domain IoTD may be independent or may serve to provide location information service, check whether passengers are on board, and collect or provide driving information through data exchange with other domains.

The IoT domain IoTD may include an IoT device actor IoT-DEV, an IoT information actor IoT-I, an IoT communication actor IoT-C, an IoT state actor IoT-S, and an IoT location actor IoT-L.

The IoT device actor IoT-DEV is an entity device that collects information including the location of a vehicle, and may be an autonomous vehicle or a general vehicle.

In order for the vehicle to collect information, the vehicle may be provided with sensors or the like. The sensor may include, for example, GNSS, IMU, Odometer, lidar, radar, camera, and the like. A method of collecting information from the IoT device actor IoT-DEV may include various methods, such as a method of collecting information directly from a connected vehicle, a method of collecting information sensed by the vehicle through an OBD port of the vehicle, and the like.

The IoT device actor IoT-DEV may store information of actors of the IoT domain IoTD and may operate a processor, as an action entity of the IoT domain IoTD.

The device sensor actor S-DEV may be provided for indoor and outdoor seamless positioning, and may be responsible for information processing with the service sensor actor S-S transmitted through the IoT communication actor IoT-C.

The IoT information actor IoT-I may include registration information, such as a type of vehicle (passenger vehicle, minibus, bus, train, bicycle, quick board, etc.), a type of fuel (electricity, engine (gasoline/diesel), no), and identification of private owning/sharing.

In addition, the IoT information actor IoT-I may be discriminated according to what vehicle a user uses (buses with more than 15 passengers, buses with less than 15 passengers, trucks less than 1 ton, trucks with 1 to 3 tons, trucks with more than 3.0 tons, cars, railroads, motorcycles, bicycles, E-mobilities, etc.), what type of fuel a vehicle uses (electricity/hydrogen, hybrid, gasoline, diesel), usage (general, rental, public, emergency (police/fire/medical)), and the like. Like the personal information actor (P-I), this may be necessary to calculate accurate information such as location or routing.

The IoT communication actor IoT-C may communicate with the cloud server CS through a communication network to improve the location information and information accuracy of vehicle. In addition, the IoT communication actor IoT-C may be responsible for information processing with the service sensor actor S-S through an available communication network mounted on the IoT device actor IoT-DEV. That is, the location information may be transmitted through a mobile communication network such as Wi-Fi, UWB, and BT.

The IoT state actor IoT-S may indicate the current state of the vehicle. That is, the IoT state actor IoT-S may be related to whether a user is driving, stopping, or parking a vehicle.

The IoT location actor may accurately analyze or determine location information for seamless positioning of the vehicle or situation information such as crossing, traversing, and intersections. On the basis of maps, access points, routing, and sensors provided in the vehicle, it is possible to classify and determine places such as a city center, provinces, indoors, and tunnels, and analyze and determine situations such as crossing, traversing, and intersections.

The execution entity of the sensor domain SD may be a manufacturer of various sensors that may be used to provide location information or a service provider that generates the location information to improve the accuracy. The sensor domain SD may refer to various sensors mounted on a device, and may be mounted on actors of each domain to provide location recognition services.

The sensor domain SD may include a service sensor actor S-S and a device sensor actor S-DEV.

The service sensor actor S-S may collectively refer to location recognition service such as triangulation by A-GPS, D-GPS, wi-fi, and the like and be provided in an actual execution entity of each domain. The A-GPS may be to provide GPS trajectory information to reduce a GPS start speed and TTFF (Time to First Fix), and the D-GPS may be to provide GPS error information.

The device sensor actor S-DEV may collectively refer to sensors that collect location information through sensors, such as GPS, lidar, radar, IMU, video, Odometer, and the like, mounted on the personal device actor P-DEV or the IoT device actor IoT-DEV, and may be provided in the actual execution entity of each domain.

The execution entity of the infrastructure domain ID may be a public or private facility management organization. The location of the infrastructure or surrounding traffic information data may be transmitted to other domains. It is possible to provide communication network access or access location information to the personal domain PD or the IoT domain IoTD through access point (AP) for triangulation, and transmit the location value determined via the access communication network to the cloud server CS.

The infrastructure domain ID may include an infrastructure communication actor I-C, an infrastructure location actor I-L, and an infrastructure elevation actor I-F.

The infrastructure communication actor I-C is collectively referred to as a network access terminal of a router mounted in major places of various infrastructures such as buildings and tunnels, or as a cloud server CS connected to the access terminal, and is responsible for transmitting the location data of the personal device actor P-DEV or the IoT device actor IoT-DEV through triangulation. That is, the location data of a vehicle that transports a user or a user terminal may be transmitted to another domain or the cloud server CS.

The infrastructure communication actor IC may transmit a unique hardware identification value such as a MAC address to help identify and locate a specific location of a personal device actor P-DEV or an IoT device actor IoT-DEV. In addition, information such as signal strength of an access point for triangulation may be provided, and information on whether the personal device actor P-DEV or the IoT device actor IoT-DEV has passed through a specific area may be provided using a frequency-enabled electronic tag identification technology such as RFID.

The infrastructure location actor I-L may transmit a location record of a tunnel matched with the unique identification value of the infrastructure to other actors. The location record transmitted by the infrastructure location actor I-L is mapped with the unique identification value of the infrastructure stored in the cloud server CS, and may be composed of classification information and address data of roads, tunnels, buildings, etc. of the corresponding infrastructure.

The infrastructure elevation actor I-F may be provided with a location specific record of the infrastructure, and include the number of indoor floors, elevators, and fingerprint maps using already established radio wave maps, and the like.

The infrastructure elevation actor (I-F) may include the number of floors mapped with a unique identification value of the infrastructure stored in the cloud server (CS) and a variety of information for triangulation, in order to check the floor number and elevation information of the personal device actor P-DEV or the IoT Device Actor IoT-DEV.

The positioning domain PTD may provide indoor or outdoor seamless positioning. It is possible to provide continuous indoor or outdoor PVT (positioning, velocity, and timing) service through sensor fusion between sensors and information exchange with the cloud server (CS).

The positioning domain PTD may include a positioning elevation actor PT-F, a positioning velocity actor PT-V, a positioning state actor PT-S, and a positioning accuracy actor PT-A.

The positioning fusion actor PT-F may recognize the position using a sensor installed independently as an execution entity of the domain and determine positioning by collecting data, such as velocity, of the actors using the sensor fusion that calculates continuously indoor and outdoor positioning, whereby the determination enables to calculate positioning which is resulting position data.

The positioning velocity actor PT-V may generate velocity data of a moving person or object through the sensed data. That is, the positioning velocity actor PT-V may determine the velocity of a moving object that is the personal device actor P-DEV or the IoT device actor IoT-DEV. It is possible to receive the sensed velocity information of the available moving object and calculate the velocity of the moving object by using the registration information of the moving object.

The positioning state actor PT-S may determine whether a moving person or object is crossing, traversing, at an intersection, whether a moving person or object is parking or stopping the vehicle, and the like, on the basis of the information received from the IoT domain IoTD. That is, it is possible to determine the location information related to whether the moving object is crossing, traversing, at an intersection, or overpass on the road, and whether the user is parking or stopping the vehicle by comprehensively determining routing information stored through a map in the cloud server CS or a moving object and available sensor information.

The positioning accuracy actor PT-A may analyze actual route data by matching navigation or routing information, thereby performing accurate determination. That is, it is possible to determine the accuracy of the moving object by comparing and analyzing routing information stored through a map in the cloud server CS or the moving object.

In order to calculate positioning of the user or transportation unit, the personal device actor P-DEV may make a request for positioning to the positioning fusion actor PT-F, and the positioning fusion actor PT-F may make a request for necessary information to other domains or actors. When collecting a plurality of pieces of information, sensor fusion between the pieces of information may occur.

In the case of an embodiment where the user is located indoors, When the personal device actor P-DEV make a request for positioning to the positioning fusion actor PT-F, the positioning fusion actor PT-F may make a request for information, such as gender, age, and the presence of absence of disability of a user, to the personal information actor P-I, and make a request for user state information, such as whether a user is currently running or walking, whether a user is boarding a transportation unit, and the like, to the personal state actor P-S.

In addition, the positioning fusion actor PT-F may make a request for location information of an infrastructure facility where a user is located, to the personal location actor P-L. When the user enters the infrastructure facility while boarding a vehicle, the infrastructure entry information may be generated and transmitted to the infrastructure communication actor I-C or the cloud server CS to be stored.

When the location of the infrastructure facility in which the user is located is specified by the personal location actor P-L, the positioning fusion actor PT-F may make a request for the number of floors or elevation information within a specified infrastructure to the personal elevation actor P-F. The personal elevation actor P-F may make a request for information, such as access points AP installed in the infrastructure facility, to determine the user's elevation location, to the infrastructure communication actor I-C. The infrastructure communication actor I-C may transmit the stored AP information. When the AP information is stored in the cloud server CS, the personal elevation actor P-F make a request for the information to the cloud server CS and receives the information, so that the information may be transmitted to the personal elevation actor P-F.

Accordingly, the positioning fusion actor PT-F may collect information between different domains through sensor fusion and thus calculate user's positioning.

In the case of an embodiment where the user is located outdoors, the personal device actor P-DEV make a request for positioning to the positioning fusion actor PT-F, and the positioning fusion actor PT-F may make a request for information to other domains or actors and receive a corresponding reply, in order to collect necessary information.

When the positioning fusion actor PT-F make a request for user's state information to the personal state actor P-S, the personal status actor P-S may make a request for boarding confirmation to check whether the user boards the transportation unit to the IoT communication actor IoT-C.

When the user boards the transportation unit, the positioning fusion actor PT-F may make a request for location of the transportation unit to the IoT location actor IoT-L, instead of the personal 1 actor P-L, and the IOT location actor IoT-L may send a location check request to the cloud server CS. The cloud server CS may transmit the location information to the positioning fusion actor PT-F or the personal device actor P-DEV.

In addition, when it is confirmed that the user has boarded the transportation unit, the IoT communication unit IoT-C or the positioning fusion actor PT-F make a request for information on velocity, state, and accuracy of the vehicle to the positioning velocity actor PT-V, the positioning state actor PT-S, and the positioning accuracy actor PT-A, and then receive a reply.

After it is confirmed that the user is on board, the location of the transportation unit may be determined. After the location is determined, even when the transportation unit enters an area, such as tunnels, where signals are not detected, on the basis of the velocity at the specified location, it is possible to calculate the expected route through information such as the terrain, the location of the transportation unit, and the velocity, and reflect the accuracy of the expected route, whereby the resulting positioning of the transportation unit may be calculated.

What is claimed is:

1. An indoor and outdoor seamless positioning transition device, the device comprising:
   a personal domain providing information related to a user;
   an Internet of Things (IoT) domain providing information related to a vehicle;
   an infrastructure domain that provides information related to an infrastructure;
   a sensor domain collecting information for data exchange between domains; and
   a positioning domain calculating positioning of the user or the vehicle using data transmitted from the domain,
   wherein the indoor and outdoor seamless positioning is calculated through data exchange between the respective domains of the personal domain, the IoT domain, the infrastructure domain, the sensor domain and the positioning domain and a cloud server,
   wherein the personal domain includes a personal information actor and a personal device actor that make a request for information processing to the personal information actor;
   the personal information actor processes personal registration information;
   the personal registration information is at least one of location, gender, age, presence or absence of a disability, and a type of disability of the user, which are necessary for calculating a distance traveled; and
   the personal registration information is transmitted to the positioning fusion actor of the positioning domain and is used for accurate calculation of the positioning.

2. The device of claim 1, wherein the respective domains have actors as sub-elements; and
   the actors of the sensor domain and the positioning domain are actors that are common to the personal domain, the IoT domain, and the infrastructure domain.

3. The device of claim 1, wherein the personal domain is provided with a personal state actor unit, the personal state actor unit analyzing whether the user is moving or whether the user is boarding the vehicle;
   the personal domain is provided with a personal location actor, the personal location actor analyzing the location of the user; and
   the personal domain is provided with a personal elevation actor, the personal elevation actor analyzing elevation information of the user including information on the number of indoor floors where the user is located.

4. The device of claim 1, wherein the IoT domain is provided with an IoT device actor, the IoT device actor collecting the location of the vehicle as an action entity of the IoT domain;
   the IoT domain is provided with an IoT information actor domain, the IoT information actor including at least one of a type of the vehicle, a type of fuel, an ownership type, and purpose of use as vehicle registration information;

the IoT domain is provided with an IoT state actor, the IoT state actor indicating whether the user is driving the vehicle or not; and the IoT domain is provided with an IoT location actor, the IoT location actor analyzing location information of the vehicle.

5. The device of claim 1, wherein the sensor domain is provided with a service sensor actor, the service sensor actor being a location recognition service using at least one of assisted global positioning system (A-GPS), differential global positioning system (D-GPS), and wi-fi; and the sensor domain is provided with a device sensor actor, the device sensor actor being attached to a personal device actor of the personal domain to collect location information of the user, or being mounted in an IoT device actor of the IoT domain to collect location information of the vehicle.

6. The device of claim 1, wherein the infrastructure communication actor of the infrastructure domain is a network access terminal of a router mounted in the infrastructure, transmits location data of a personal device actor of the personal domain or location data of an IoT device actor of the IoT domain, transmits a hardware unique identification value including an MAC address of the personal device actor or the IoT device actor, provides information including signal strength of access point for triangulation, and provides information on whether the personal device actor or the IoT device actor moves through a specific area.

7. The device of claim 1, wherein an infrastructure location actor of the infrastructure domain transmits a location record matched with a unique identification value of the infrastructure to another domain, the location record being location information mapped with the unique identification value of the infrastructure stored in the cloud server and being composed of identification information or address data of the infrastructure; and the infrastructure elevation actor of the infrastructure domain transmits elevation information of a personal device actor or an IoT device actor to another domains.

8. The device of claim 1, wherein a positioning velocity actor of the positioning domain receives velocity information of a moving object including a personal device actor of the personal domain or an IoT device actor of the IoT domain;

a positioning state actor of the positioning domain determines a state of the user or the vehicle, including at least one of location information related to whether the user is crossing, traversing, at an intersection or overpass, on a road, and information related to whether the user is parking or stopping the vehicle, using routing information of the user or the vehicle; and a positioning accuracy actor of the positioning domain determines accuracy of movement of the user or the vehicle.

9. The device of claim 1, wherein a positioning fusion actor of the positioning domain makes a request for information necessary for positioning calculation to at least one of a personal information actor, a personal state actor, a personal location actor, and a personal elevation actor in the personal domain; an IoT location actor in the IoT domain; and a positioning velocity actor, a positioning state actor, and positioning accuracy actor of the positioning domain;

when the user is located indoors, the personal location actor or the personal elevation actor determines the location or elevation of the user by exchanging information with the infrastructure communication actor of the infrastructure domain;

when the user is located outdoors, the positioning fusion actor receives a state of the user from the personal state actor;

when the user boards the transportation unit, the personal state actor performs pairing with an IoT device actor of the IoT domain through an IoT communication actor of the IoT domain;

the positioning fusion actor receives location information of the transportation unit from the IoT location actor; and the IoT communication actor or the positioning fusion actor make a request for information to at least one of the positioning velocity actor, the positioning state actor, and the positioning accuracy actor; and the positioning fusion actor calculates positioning by performing sensor fusion of information received from another domain or an actor that is a sub-element of each domain.

10. An indoor and outdoor seamless positioning transition device, the device comprising:

a personal domain providing information related to a user;

an Internet of Things (IoT) domain providing information related to a vehicle;

an infrastructure domain that provides information related to an infrastructure;

a sensor domain collecting information for data exchange between domains; and a positioning domain calculating positioning of the user or the vehicle using data transmitted from the domain, wherein the indoor and outdoor seamless positioning is calculated through data exchange between the respective domains of the personal domain, the IoT domain, the infrastructure domain, the sensor domain and the positioning domain and a cloud server, wherein an infrastructure location actor of the infrastructure domain transmits a location record matched with a unique identification value of the infrastructure to another domain, the location record being location information mapped with the unique identification value of the infrastructure stored in the cloud server and being composed of identification information or address data of the infrastructure; and the infrastructure elevation actor of the infrastructure domain transmits elevation information of a personal device actor or an IoT device actor to another domains.

11. An indoor and outdoor seamless positioning transition device, the device comprising:

a personal domain providing information related to a user;

an Internet of Things (IoT) domain providing information related to a vehicle;

an infrastructure domain that provides information related to an infrastructure;

a sensor domain collecting information for data exchange between domains; and a positioning domain calculating positioning of the user or the vehicle using data transmitted from the domain, wherein a positioning fusion actor of the positioning domain makes a request for information necessary for positioning calculation to at least one of a personal information actor, a personal state actor, a personal location actor, and a personal elevation actor in the personal domain;
an IoT location actor in the IoT domain; and a positioning velocity actor, a positioning state actor, and positioning accuracy actor of the positioning domain;
when the user is located indoors, the personal location actor or the personal elevation actor determines the location or elevation of the user by exchanging information with the infrastructure communication actor of the infrastructure domain;
when the user is located outdoors, the positioning fusion actor receives a state of the user from the personal state actor;
when the user boards the transportation unit, the personal state actor performs pairing with an IoT device actor of the IoT domain through an IoT communication actor of the IoT domain;
the positioning fusion actor receives location information of the transportation unit from the IoT location actor; and
the IoT communication actor or the positioning fusion actor make a request for information to at least one of the positioning velocity actor, the positioning state actor, and the positioning accuracy actor; and
the positioning fusion actor calculates positioning by performing sensor fusion of information received from another domain or an actor that is a sub-element of each domain.

* * * * *